United States Patent [19]

Rettig et al.

[11] Patent Number: 4,800,964
[45] Date of Patent: Jan. 31, 1989

[54] COMPACT SHANK ASSEMBLY WITH LEAF SPRING

[75] Inventors: Vernon E. Rettig, Bondurant; Ronald M. Steilen; Jeffrey J. Postal, both of Ankeny, all of Iowa

[73] Assignee: Deere & Company, Moline, Ill.

[21] Appl. No.: 44,537

[22] Filed: May 1, 1987

[51] Int. Cl.$^4$ .............................................. A01B 61/04
[52] U.S. Cl. ..................................... 172/711; 172/710; 172/705; 172/198
[58] Field of Search ............... 172/142, 160, 196, 198, 172/514, 515, 516, 699, 703, 704, 705, 706, 710, 711, 712, 794

[56] References Cited

FOREIGN PATENT DOCUMENTS 0001079 3/1926 Austria .
0278115 11/1966 Austria .

Primary Examiner—Deborah L. Kyle
Assistant Examiner—John W. Eldred

[57] ABSTRACT

A compact, leaf spring biased shank assembly with a shank bracket which clamps to a tube and leaves the upper portion of the tube relatively unobstructed to eliminate interference with the lift mechanism and/or implement frame. The shank bracket includes easily accessible down pressure and shank height pins for quick, effortless adjustments of the shank assembly. The leaf spring is C-shaped and is designed to approach a straightened condition as the shank moves.

13 Claims, 3 Drawing Sheets

COMPACT SHANK ASSEMBLY WITH LEAF SPRING

BACKGROUND OF THE INVENTION

The present invention relates generally to agricultural implements, and more specifically, to a spring biased shank assembly for an implement such as a cultivator, chisel plow or grain drill.

Many field cultivator, chisel plow and grain drill opener shanks are clamped to square bars or square tubes. Usually part of the clamping bracket extends above the center line of the tube to provide a support for a coil spring which applies down pressure to the shank. Sometimes it is desirable to rotate the square tube in order to raise and lower the ground engaging tool. It is also desirable to be able to clamp the bracket anywhere along the tube. In conventional designs, the lift mechanism and/or machine frame often interfere with desired shank bracket positions. Adjusting down pressure of individual shanks is a difficult job requiring the operator to be in an awkward position while having to strain to put in a pin or to secure a clip.

BRIEF SUMMARY OF THE INVENTION

It is therefore an object of the present invention to provide an improved shank assembly for an agricultural implement. It is a further object to provide such a shank assembly which has a more compact configuration with a lower profile to allow lift and/or frame members to be located closely adjacent the shank support tube. It is yet another object to provide such an assembly which is spring biased and wherein the spring does not project above the shank support tube.

It is still a further object of the present invention to provide an improved shank assembly for an agricultural implement attachable at most any location along a support tube in non-interfering relationship with lift structure an/or implement frame structure. It is another object to provide such a device which includes a shank bracket that does not project above the support tube. It is still another object to provide such an assembly which is easy to adjust without physical exertion and without need for tools.

It is still a further object of the present invention to provide an improved shank assembly for an agricultural implement including a compact leaf spring down pressure arrangement. It is another object to provide such an assembly wherein the down pressure and shank height adjustments may be made easily without tools. It is still another object of the present invention to provide such a shank assembly wherein the leaf spring is advantageously supported by the shank bracket to optimize the leaf spring deflection characteristics.

A shank assembly constructed in accordance with the present invention includes a mounting bracket which is connected to a support tube and extends downwardly below the support tube pivotally supporting the forward end of a conventional shank. A downwardly opening, C-shaped leaf spring is supported adjacent its forward end by the bracket and has a shank contacting rear portion biasing the shank downwardly into the soil engaging position. The bracket is apertured to receive an upper pin which bears against the upper portion of the leaf spring to provide down pressure. The down pressure may be adjusted by changing the hole location through which the pin is inserted. Shank height adjustment is provided by a second pin and a plurality of holes at the lower portion of the shank bracket.

The leaf spring is maintained below the upper portion of the shank bracket which in turn is connected to the lower portion of a support or pivot tube on the implement so that substantially all the shank assembly remains below the center line of the support tube, leaving the upper half of the tube obstructed so that the opener lift mechanism or other structure on the implement may be located directly over the individual openers. The low profile also permits the shank assembly to be positioned at virtually any location along the support tube without interference with any other structure such as the frame on the implement. Access to the individual down pressure and shank height adjusting pins is unobstructed. Individual shanks can easily be adjusted by using the hydraulic lift on the implement to remove spring pressure. With the spring pressure removed, the down pressure and shank height pins can be removed from their respective hole locations and re-installed in different hole locations without tools or physical exertion.

These and other objects, features and advantages of the present invention will become apparent to those skilled in the art from the description which follows and from the drawings.

DESCRIPTION OF THE PREFERRED EMBODIMENT

Figure 1:
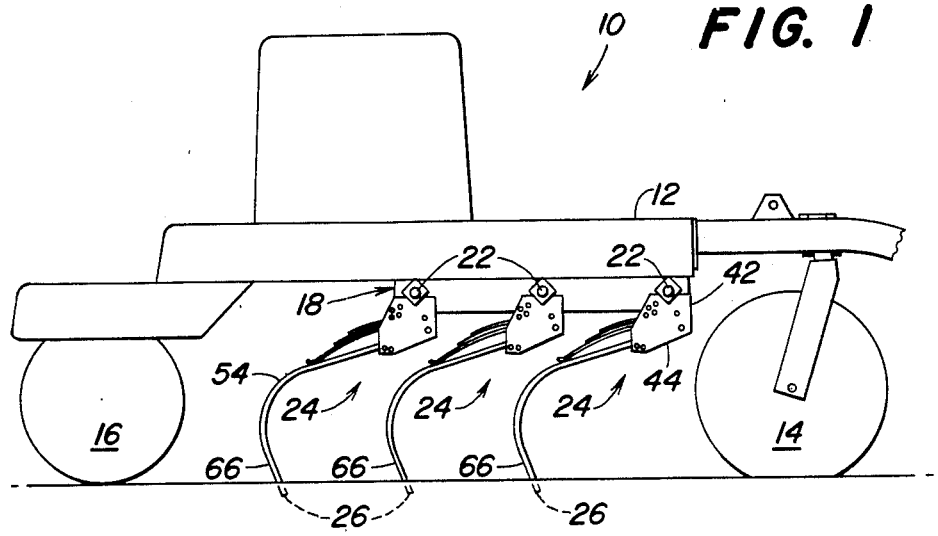
FIG. 1 is a side view of an implement with the shank assembly of the present invention attached thereto.

Referring now to FIG. 1, there is shown an agricultural implement indicated generally at 10 and including a main frame 12 supported for forward movement over the field by wheels 14 and 16. Connected to the frame 12 is a lift frame assembly 18 carrying a plurality of transversely extending and fore-and-aft spaced support beams or tubes 22 on which are mounted a plurality of transversely spaced shank assemblies 24 carrying earthworking tools 26 at their lower ends. The tubes 22 are rockable about their transverse axes to move the shank assemblies 24 between an earthworking position (FIG. 1) and a raised transport position (broken lines of FIG. 4).

The shank assemblies 24 include a shank support bracket 32 fabricated from a pair of upright plates 34 including uppermost portions 36 adapted for receipt by the support tube 22. The upper portions 36 are spaced by front and rear transverse connecting members 38 welded to the inside upper surfaces of the plates 34. The plates 34 are generally mirror images of each other and include a forward edge 42 extending downwardly to a rearwardly and downwardly disposed edge 44 terminating in a short generally horizontal rear edge 46. A vertical edge 48 extends upwardly from the edge 46 to a rear central location 50. From the location 50, the plates extend upwardly and forwardly toward the upper portions 36.

Figure 3:
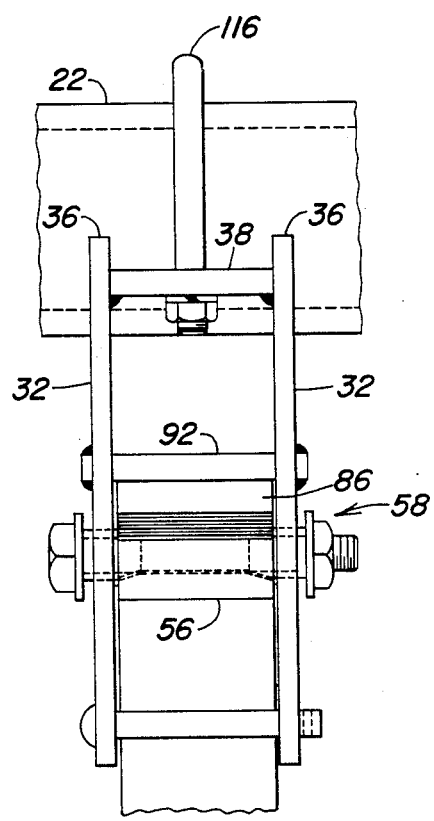
FIG. 3 is a view taken substantially along the line 3—3 of FIG. 2.
Figure 2:
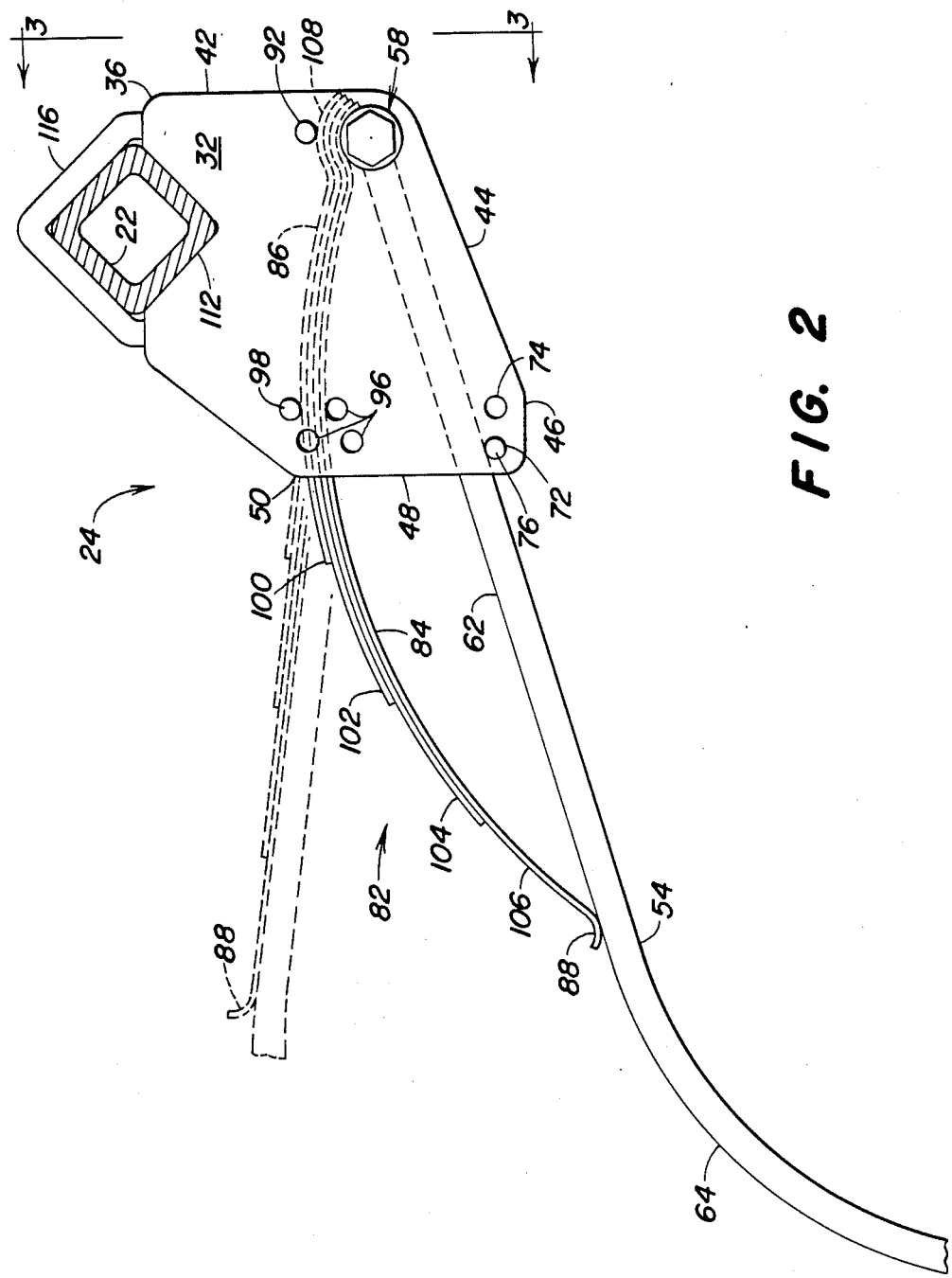
FIG. 2 is an enlarged side view of the shank assembly utilized on the implement in FIG. 1.

A shank 54 includes an eye end 56 (FIG. 3) pivotally connected to the lower forward portion of the shank support bracket 32 by pivot structure 58. The shank 54, as shown in FIG. 2, includes a relatively straight upper portion 62 which extends rearwardly to a portion 64 which curves downwardly and forwardly (FIG. 1) and terminates in a tool receiving end 66.

The bracket 32 is apertured at locations 72 and 74 and a pin 76 is inserted through a selected set of the apertures to act as a stop to limit the downward rocking of the shank 54 about the pivot structure 58. As is evident from FIG. 2, moving the pin 76 to the pair of forward apertures 74 increases the amount the shank 54 may rock downwardly, while moving the pin 76 to the rear set of apertures 72 decreases the amount of downward rocking.

To provide a downward bias for the shank 54 to yieldingly urge the tools 26 into the earthworking position as shown in FIG. 1, spring structure 82 is supported by the shank support bracket 32 in contact with the shank 54. The spring structure 82 includes a leaf spring 84 having a generally C-shaped configuration opening downwardly and including a forward end 86 contained within the shank support bracket 34 and a rearward end 88 projecting downwardly into abutment with the shank 54 adjacent the aft end of the straight upper portion 62. The forward end 86 is sandwiched between the pivot structure 58 and a retaining pin 92 connected between the plates 34 adjacent the forward edge 42.

To provide adjustable down pressure on the shank 54, the side plates 34 are apertured at locations 96 to receive a stop pin 98 which bears against the top of the leaf spring 84 and deflects the central portion of the leaf spring downwardly from its free position. The amount of down pressure can be adjusted by changing the location of the stop pin 98 in the holes 96. By inserting the pin 98 into a lower set of holes, the down pressure on the shank 54 is increased. Moving the pin 98 to a higher set of apertures 96 will decrease the down pressure on the shank 54. As best seen in FIG. 2, the pin 98 also limits the upward rocking of the shank assembly 54 about the pivot structure 58 to an uppermost position (broken lines). By supporting the forward end 86 of the spring 84 on the pivot structure 58, the leaf spring 84 will approach a straightened condition at the maximum upwardly rocked position of the shank 54 to optimize utilization of the spring characteristics of the leaf spring and to prevent reverse curvature of the spring during upward tripping of the shank.

As shown in FIG. 2, the leaf spring 84 includes four leaves, 100, 102, 104 and 106, which are stacked and increase in length from the top leaf 100 to the bottom leaf 106. The rearward end 88 of the leaf spring 84 is defined by the bottom leaf 106, and is bent rearwardly and upwardly to accommodate sliding movement of the leaf 106 against the shank 54 as the shank rocks about the pivot structure 58. The forward ends of the leaves 100, 102, 104 and 106 are fabricated with a small downwardly directed curvature at 108 for improved fit between the pin 92 and the generally circular shaped eye end 56.

Figure 4:
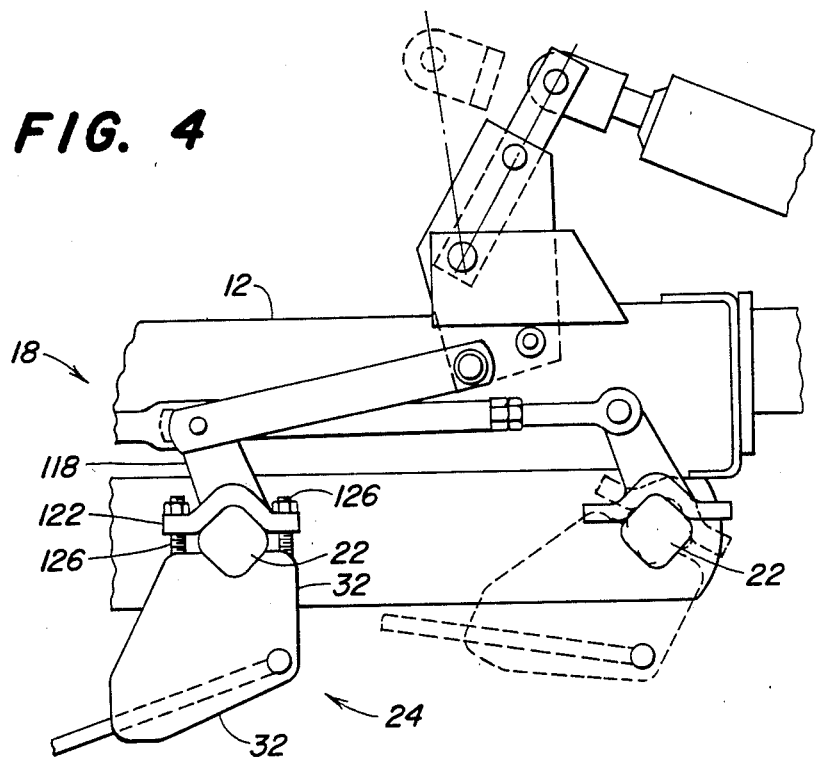
FIG. 4 is a side view of a lift frame assembly.

The shank support bracket 32 is notched at 112 to conform to the lower portion of the support tube 22. The entire shank support bracket 32 and the spring structure 82 are maintained below the top half of the support tube 22 so that the shank assemblies 24 may be mounted anywhere along the tube 22 without interfering with the lift frame assembly 18 (FIG. 4) or the implement frame 12. As shown in FIG. 2, the shank support bracket 32 is connected by a U-bolt 116 to the tube 22. As seen in FIG. 4, the lift assembly 18 includes a lift input arm 118 with a bracket 122 adapted to fit over the top half of the tube 22. When it is necessary to locate a shank assembly 24 immediately below the lift input arm 118, a pair of straight bolts 126 are connected between the bracket 122 and the support bracket 32 to secure the shank assembly 24 in position on the tube 22. By providing a low profile on the shank support bracket 32 and the spring structure 82, more flexibility is achieved for positioning the shank assemblies 24 on the tubes 22 without interference from any portion of the lift frame assembly 18 or the implement frame 12.

To change the down pressure adjustment relatively effortlessly, the lower pin 72 is removed while the shank is rocked upwardly. The lift assembly 18 is activated to permit the shank to rock downwardly until spring pressure on the upper pin 98 is released. The pin 98 is then repositioned in a different set of the holes 96. Thereafter the lift assembly 18 is activated to cause the shank 54 to rock upwardly against the spring bias beyond the locations of the holes 72 and 74, and the pin 76 is inserted into one of the sets of holes to achieve the desired down stop position.

Having described the preferred embodiment, it will be apparent that modifications can be made without departing from the scope of the invention as defined in the accompanying claims.

We claim:

1. A shank assembly adapted for mounting on a support beam of an implement, comprising:
   a shank support bracket;
   a fore-and-aft extending shank having a forward end pivotally connected to the support bracket, an intermediate portion extending rearwardly from the forward end, and an end portion adapted for mounting a tool;
   spring means for biasing the shank downwardly about the pivotal connection with the support bracket, said spring means comprising: a leaf spring having a forward end, a central portion, and a rearward shank abutting end, and means connecting the forward end of the leaf spring to the support bracket adjacent the pivotal connection; and
   wherein the central portion of the leaf spring is concave downwardly and is offset above the shank, and the support bracket includes spring contacting means bearing downwardly against the central portion of the leaf spring for deflecting the leaf spring toward the shank and accommodating pivoting of the shank relative to the support bracket about the pivotal connection between upper and lower rocked positions.

2. A shank assembly adapted for mounting on a support beam of an implement, comprising:
   a shank support bracket;
   a fore-and-aft extending shank having a forward end pivotally connected to the support bracket, an intermediate portion extending rearwardly from the forward end, and an end portion adapted for mounting a tool;
   spring means for biasing the shank downwardly about the pivotal connection with the support bracket, said spring means comprising: a leaf spring having a forward end, a central portion, and a rearward shank abutting end, and means connecting the forward end of the leaf spring to the support bracket above the pivotal connection;
   wherein the central portion of the leaf spring is concave downwardly and the support bracket includes spring contacting means bearing downwardly against the central portion of the leaf spring; and means for adjustably limiting the downward rocking of the shank to a lowermost position including pin means selectively positionable in the support bracket.

3. A shank assembly adapted for mounting on a support beam of an implement, comprising:

a shank support bracket;

a fore-and-aft extending shank having a forward end pivotally connected to the support bracket, an intermediate portion extending rearwardly from the forward end, and an end portion adapted for mounting a tool;

spring means for biasing the shank downwardly about the pivotal connection with the support bracket, said spring means comprising: a leaf spring having a forward end, a central portion, and a rearward shank abutting end, and means connecting the forward end of the leaf spring to the support bracket above the pivotal connection;

wherein the central portion of the leaf spring is concave downwardly and the support bracket includes spring contacting means bearing downwardly against the central portion of the leaf spring; and wherein the support bracket is apertured and the spring contacting means includes a pin selectively positionable in the bracket apertures to selectively deflect the leaf spring.

4. The invention as set forth in claim 1 wherein the support bracket includes an uppermost portion adapted for receipt by the support beam, and the leaf spring is located entirely below the uppermost portion to thereby avoid interference with portions of the implement above and adjacent the support beam.

5. The invention as set forth in claim 1 wherein the forward end of the leaf spring is supported against the forward end of the shank.

6. The invention as set forth in claim 1 wherein the shank is rockable to an uppermost maximum rocked position wherein the leaf spring is deflected to generally conform to the shape of the shank.

7. The invention as set forth in claim 6 wherein said spring contacting means limits the upward rocking of the shank to the maximum upwardly rocked position.

8. The invention as set forth in claim 7 wherein the support bracket is apertured above the shank, and the spring contacting means comprises pin means selectively insertable into the apertures for adjusting the maximum upwardly rocked position.

9. A shank assembly adapted for mounting on a transversely extending beam of an implement, the shank assembly comprising:

an upright shank bracket including a pair of transversely spaced sides extending in the fore-and-aft direction;

a shank including a forward end connected to the shank bracket for rocking between the sides about a transverse pivotal axis between upper and lower positions, said shank extending rearwardly from the forward end to a downwardly directed tool receiving portion;

a leaf spring having a forward end supported between the sides above the forward end of the shank and curving upwardly in the rearward direction therefrom to a central portion, said leaf spring curving downwardly from the central portion to a shank contacting aft portion; and stop means bearing against the central portion of the leaf spring for yieldingly biasing the shank downwardly about the pivotal axis toward the lower position.

10. A shank assembly adapted for mounting on a transversely extending beam of an implement, the shank assembly comprising:

an upright shank bracket including a pair of transversely spaced sides extending in the fore-and-aft direction;

a shank including a forward end pivotally connected to the shank bracket for rocking between the sides about a transverse axis, said shank extending rearwardly fro mthe forward end to a downwardly directed tool receiving portion;

a leaf spring having a forward end supported between the sides above the forward end of the shank and curving upwardly in the rearward direction therefrom to a central portion, said leaf spring curving downwardly from the central portion to a shank contacting aft portion;

stop means bearing against the central portion of the leaf spring for biasing the shank downwradly about its pivotal connection with the bracket; and means for adjusting the stop means vertically with respect to the shank bracket for varying the downward bias of the leaf spring against the shank.

11. The invention as set forth in claim 10 wherein the stop means comprises a pin extending through the shank bracket, and the means for adjusting comprises a portion of the bracket having a plurality of vertically spaced apertures for receiving the pin.

12. The invention as set forth in claim 9 wherein the upper portion of the shank bracket includes a beam receiving area, and means for mounting the shank bracket on the beam with the shank and bracket located below a horizontal plane passing through the beam .

13. The invention as set forth in claim 12 wherein the stop means comprises pin means extending between the spaced sides for containing the leaf spring below the upper portion of the shank bracket so that the entire shank assembly is maintained below a horizontal plane passing through the beam.

* * * * *